(12) United States Patent
Araujo et al.

(10) Patent No.: US 10,169,152 B2
(45) Date of Patent: Jan. 1, 2019

(54) RESILIENT DATA STORAGE AND RETRIEVAL

(71) Applicant: International Business Machines Corporation, Armonk, NY (US)

(72) Inventors: Murilo O. Araujo, Limeira (BR); Ricardo M. Matinata, Campinas (BR); Rafael P. Sene, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/262,155

(22) Filed: Sep. 12, 2016

(65) Prior Publication Data

US 2018/0074901 A1    Mar. 15, 2018

(51) Int. Cl.
*G06F 11/10*        (2006.01)

(52) U.S. Cl.
CPC ................. *G06F 11/1092* (2013.01)

(58) Field of Classification Search
CPC ......... G11C 2029/0411; G06F 11/1076; G06F 11/1008; G06F 11/106; G06F 11/1092; H05K 999/99
USPC ......................................................... 714/764
See application file for complete search history.

(56) References Cited

U.S. PATENT DOCUMENTS

| | | | |
|---|---|---|---|
| 5,864,655 A * | 1/1999 | Dewey ................ | G06F 11/1076 714/42 |
| 6,530,036 B1 | 3/2003 | Frey, Jr. | |
| 7,653,668 B1 * | 1/2010 | Shelat ................. | G06F 11/2094 707/610 |
| 7,657,796 B1 * | 2/2010 | Kaiser ................. | G06F 11/1435 707/821 |
| 8,245,101 B2 | 8/2012 | Olbrich et al. | |
| 8,650,434 B2 * | 2/2014 | Orsini ................. | G06F 11/1076 714/4.1 |
| 8,799,413 B2 | 8/2014 | Taylor et al. | |
| 9,223,654 B2 | 12/2015 | Molaro et al. | |
| 9,384,254 B2 | 7/2016 | Tekade et al. | |
| 9,507,843 B1 * | 11/2016 | Madhavarapu ... | G06F 17/30575 |
| 9,800,656 B2 | 10/2017 | Vallabhaneni et al. | |
| 2004/0133544 A1 | 7/2004 | Kiessig et al. | |
| 2005/0216788 A1 | 9/2005 | Mani-Meitav et al. | |

(Continued)

OTHER PUBLICATIONS

"Accelerated Examination Support Document", International Business Machines Corporation, dated Jul. 21, 2017, 23 pages.

(Continued)

*Primary Examiner* — Albert Decady
*Assistant Examiner* — Enam Ahmed
(74) *Attorney, Agent, or Firm* — Daniel C. Housley

(57) ABSTRACT

Data recovery following the loss of a volume manager is described, wherein a volume manager receives a command, and location information and credentials to access a distributed storage. The data to be recovered may include one or more data files stored as one or more discrete portions. Each portion includes metadata, including at least a file ID tag. The volume manager retrieves each portion of data from the distributed storage and records, in an index, the location that each portion of data was retrieved from. The volume manager reads and stores the file ID tag with the associated location of the attached portion of data in the distributed storage in the volume manager index.

17 Claims, 8 Drawing Sheets

(56) References Cited

U.S. PATENT DOCUMENTS

| | | | |
|---|---|---|---|
| 2008/0172563 A1* | 7/2008 | Stokes | G06F 21/80 |
| | | | 713/193 |
| 2012/0221854 A1* | 8/2012 | Orsini | G06F 21/606 |
| | | | 713/167 |
| 2012/0259901 A1 | 10/2012 | Lee et al. | |
| 2013/0198130 A1* | 8/2013 | Resch | G06F 17/30106 |
| | | | 707/609 |
| 2015/0154075 A1 | 6/2015 | Sugimoto et al. | |
| 2015/0193302 A1 | 7/2015 | Hyun et al. | |
| 2015/0309888 A1 | 10/2015 | Hsu-Hung | |
| 2016/0085628 A1 | 3/2016 | Hayes et al. | |
| 2016/0274806 A1* | 9/2016 | Barnes | G06F 12/0813 |
| 2017/0177612 A1* | 6/2017 | George | G06F 17/30171 |
| 2017/0272209 A1* | 9/2017 | Yanovsky | G06F 3/0619 |

OTHER PUBLICATIONS

Araujo et al., "Resilient Data Storage and Retrieval", U.S. Appl. No. 15/660,082, filed Jul. 26, 2017.

List of IBM Patents or Patent Applications Treated as Related, dated Jul. 25, 2017, pp. 1-2.

\* cited by examiner

US 10,169,152 B2

RESILIENT DATA STORAGE AND RETRIEVAL

BACKGROUND

The present disclosure relates to data storage, and more specifically, to improving the resiliency of data storage.

Distributed storage is relied on by many computing systems for secure, low-cost data storage. One form of distributed storage is a redundant array of independent disks (RAID) which uses virtualization technology to combine multiple physical drive components into a single logical unit. This may be done for purposes of data redundancy or performance improvement, or both. Data may be distributed across the drives in numerous ways, depending on the desired balance among reliability, availability, performance, and capacity.

Many of these distribution options employ an error protection scheme called "parity." Parity is included to provide a fault tolerance in a given set of data. It generally uses a simple "exclusive disjunction," or "exclusive or" (XOR), logical operation which outputs true only when inputs differ.

SUMMARY

According to embodiments of the present disclosure, a computer-implemented method for data recovery following the loss of a volume manager is described. To carry out the method, a volume manager may receive location information and credentials to access a distributed storage, and receive a command to recover data from the distributed storage. The data to be recovered may include one or more data files, and each data file may be stored as one or more discrete portions. Each portion may include metadata, which may include at least a file ID tag.

The volume manager may retrieve each portion of data from the distributed storage and record, in an index, the location in the distributed storage that each portion of data was retrieved from. The volume manager may read the file ID tag attached to each retrieved portion of data and store the file ID tag with the associated location of the attached portion of data in the distributed storage in the volume manager index.

A computing system and computer program product may embody the method and structures of the disclosure. The computing system may comprise a network, a memory configured to store a volume manager, and a processor in communication with the memory. The computing system may be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Aspects of the present disclosure relate to data storage, more particular aspects relate to improving the resiliency of data storage. While the present disclosure is not necessarily limited to such applications, various aspects of the disclosure may be appreciated through a discussion of various examples using this context.

Described herein are embodiments of a computer-implemented method for data recovery following the loss of a volume manager. Generally, the loss of a volume manager may completely cripple a system, as the volume manager may be a single reference point for the recovery of data stored throughout a distributed storage system. This disclosure provides, if the volume manager is lost, recovery of data from a distributed storage system may be accomplished based on unique metadata stored with individual portions of the stored data. In this way, recovery procedures may be run based on the metadata protected by distribution throughout the distributed storage system.

The metadata may also be formatted to support reconstruction of data files, stored in multiple portions, following the loss of a distributed storage unit. The metadata stored with portions of a data file may contain redundant data, which may be called parity data, concerning other portions of the data file to allow reconstruction of a data portion overwritten or lost along with a distributed storage unit. By creating a thorough metadata tag and storing key pieces of retrieval data along with data portions in a distributed storage, the resiliency of the data may be improved.

The discrete data portions may be tagged and distributed according to a set of storage profile rules. The storage profile rules may be intrinsic to the volume manager or stored externally, e.g. on an independent memory or a third-party system. The storage profile rules may indicate how many portions a particular data file should be divided into, e.g. based on file size or type of security layer. The storage profile rules may indicate the type and level of security a particular data file, or data portions of a data file, should receive.

Figure 1:
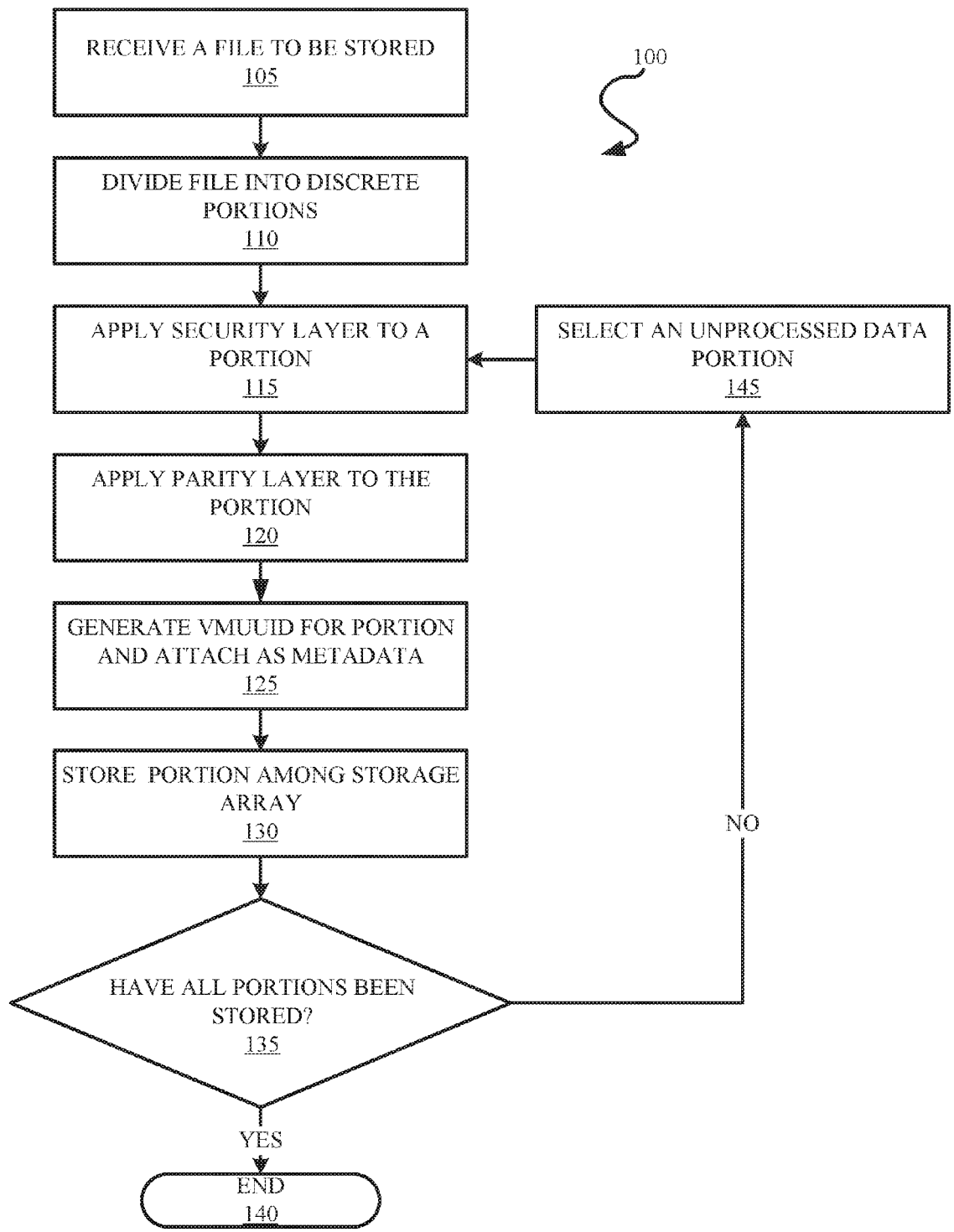
FIG. 1 depicts an example method of tagging and storing data in a distributed storage, according to embodiments of the present disclosure.

Referring now to FIG. 1, an example method 100 of tagging and storing data in a distributed storage is depicted in a flowchart, according to embodiments of the present disclosure. The method 100 may generally be carried out by a volume manager, but in some embodiments may be carried out by another capacity allocation program or by an operating system.

The volume manager receives a data file to be stored, as in operation 105. The data file may be divided into discrete portions, as in operation 110, to be stored throughout a distributed storage. The distributed storage may be a block, file, or object storage. The storage may use database nodes or peer network nodes accessed via a network, and may be a cloud, or local or remote database storage. The distributed storage may be, for example, a redundant array of independent disks (RAID).

In some embodiments, a file ID tag may be generated for the entire data file and may be attached to each data portion that the data file is divided into for storage.

The volume manager may apply a security layer to a data portion to be stored, as in operation 115. The security layer may generally be a type of cipher algorithm, but other security layers may be used. In some embodiments, e.g. systems using local block distributed storage, the security layer may be foregone on the individual portions and security provided by other means. When a security layer is used, it may generally be identified and attached to the data, or data portion, as metadata.

The volume manager may generate and apply parity data to the portion, as in operation 120. Parity refers to a technique of identifying data loss due to loss of a storage unit or possible write over. Parity systems may additionally store redundant parity information that allows for the reconstruction of data if a drive failure or overwrite occurs.

The volume manager may generate a volume manager universally unique identifier (VMUUID) for the data portion and attach it to the data portion as metadata, as in operation 125. The VMUUID is a unique identifier associated with the data portion that contains information to support retrieval of the stored data portion when necessary. The VMUUID may generally be a compound element, incorporating and organizing other elements of the data portion's metadata (e.g. the security layer, the parity layer). The volume manager may generate a file ID tag for a new data file to be stored in the distributed storage. The file ID tag may be part of the VMUUID or a separate identifier.

The volume manager may store the data portion in the storage array, as in operation 130. The data portion may generally be written to a location in the storage array according to a set of storage profile rules. In some embodiments, the storage profile rules may be used in other operations of the method as well, such as operations to divide the data into portions (e.g. a block algorithm) and operations to apply a security layer (e.g. a cipher algorithm). In some embodiments, the storage profile rules may be stored and executed by a storage profile rules engine that may be separate or within the volume manager. In other embodiments, the rules may be stored and executed by the volume manager, or stored independently and executed by either a rules engine or the volume manager.

The storage profile rules may indicate that metadata associated with a data portion should include the data type of the data portion or the data type of the file the data portion contributes to. The storage profile rules may indicate the appropriate cipher level for the data portion, or that each data portion of a data file should have a different cipher level, and an appropriate parity model. The storage profile rules may indicate the inclusion of the total number of data portions needed to complete a data file and the size of the complete data file in the metadata, or that each data portion of a given data file should be stored on a separate unit of the distributed storage when possible.

The volume manager may perform a check to determine if all data portions of the data file have been stored, as in decision block 135. If the determination finds that all data portions of the data file have been stored, the method 100 may end, as in operation 140. If the determination is negative, that there are data portions remaining to be stored, the volume manager may identify and select an unprocessed data portion of the data file, as in operation 145. The volume manager may apply a security layer to the unprocessed data portion as in operation 115.

Though the flowchart of example method 100 depicts the application of the security layer as occurring first, the elements of the metadata may be applied in any order, e.g. the parity layer may be applied before the security layer, the VMUUID may be generated first, etc. In some embodiments, it may be advantageous to generate the VMUUID as the final element of metadata, as it may incorporate each of the data portion's other elements of metadata.

Figure 2:
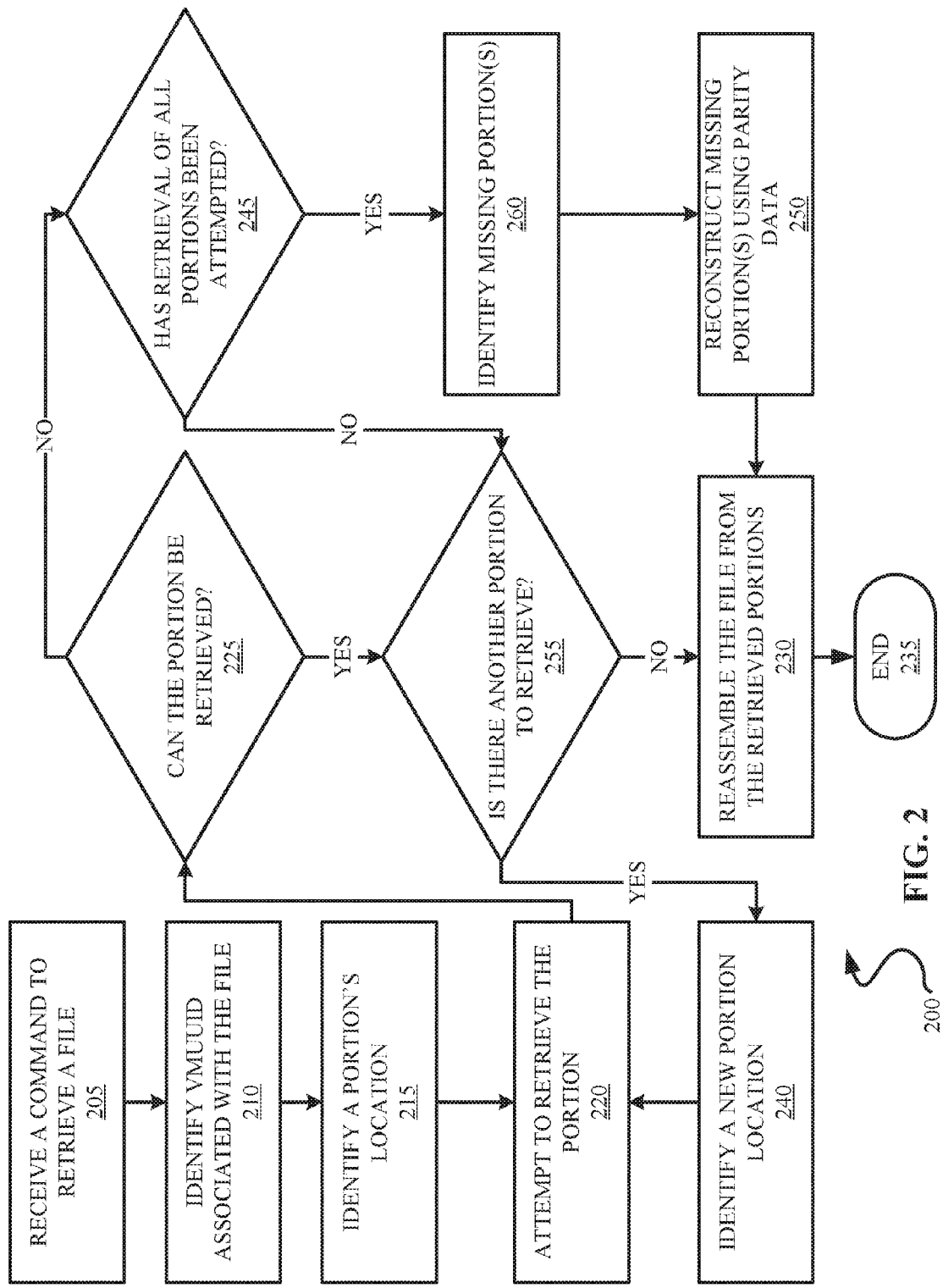
FIG. 2 depicts a computer-implemented method for data recovery following the loss of a distributed storage unit, according to embodiments of the present disclosure.

Referring now to FIG. 2, a computer-implemented method 200 for data recovery following the loss of a distributed storage unit is depicted as a flowchart, according to embodiments of the present disclosure. As with method 100 (FIG. 1), the method 200 may generally be executed by a volume manager, but in some embodiments, the method 100 may be executed by other programs or hardware.

The volume manager may receive a command to retrieve a data file from a distributed storage, as in operation 205. The volume manager may identify a VMUUID associated with the data file to be retrieved, as in operation 210, for example, by reviewing an index of data files it manages. The index may be maintained by the volume manager and may provide further information about the data file, such as the number of data portions the data file to be retrieved was divided into. The index may identify each of the data portions by a VMUUID associated with data file, or each data portion may have an individual VMUUID. The index may further indicate whether a data portion contains parity and/or cipher data, and the type of parity and/or cipher data contained.

The volume manager may consult the index to determine a location in the distributed storage for a first data portion of the data file to be retrieved, as in operation 215. In some embodiments, the location may be included in the integral data of the VMUUID. In other embodiments, the index may be set up as a chart or map indicating locations for each VMUUID and associated data portion. In these embodiments, the VMUUID may not contain the location information. Other formats for the index and storing of the location information are possible as well, e.g. a table, a document, etc.

The volume manger may attempt to retrieve, from the distributed storage, a first data portion of the data file from the distributed storage, as in operation 220. The volume manager may determinate whether the data portion may be retrieved, as in decision block 225. If the data portion may be successfully retrieved, the volume manager may determine whether additional data portions remain to be retrieved, as in decision block 255. If the volume manager determines that additional data portions do remain to be retrieved, the volume manager may determine a new data portion's location, e.g. from the index, as in operation 240. The volume manager may then return to operation 220 to attempt to retrieve the new data portion.

The volume manager may make another determination, at decision block 225, as to whether to new data portion was successfully retrieved. If yes, the volume manager may make another determination, at decision block 255, as to whether there is still another data portion of data to be retrieved. If at this point the determination is negative (e.g., all data portions have been successfully retrieved), the volume manager may reassemble the file from the retrieved data portions, as in operation 230. The method may then end, as in operation 235.

If, at decision block 225, the determination is negative (e.g., one or more of the data portions of the data file may not be retrieved), another determination may be made, at decision block 245, as to whether an attempt has been made to retrieve each of the data portions that make up the file to be retrieved. If the determination is negative (e.g., retrieval of each data portion of the file has not been attempted), the volume manager may determine, at decision block 255, that there remains at least one new data portion to attempt to retrieve.

If, at decision block 245, the determination is positive (e.g., retrieval of each data portion of the file to be retrieved has been attempted), the data portion or data portions that are missing or unretrievable may be identified, as in operation 260. The missing data portion or data portions may generally be identified based on data extracted from the VMUUID or otherwise present in the metadata of the retrieved data portions. For example, the VMUUID may contain data indicating the total number of data portions that make up the data file, if fewer than that number has been retrieved, the volume manager may determine that one or more data portions are missing. Data indicating which data portions make up a data file may be included in the metadata, may be retrieved from the volume manager index or from some other storage location, etc.

The volume manager may reconstruct the one or more data portions that cannot be retrieved using the parity data extracted from the data portions which were successfully retrieved, as in operation 250. The parity data may be extracted from the VMUUID or another part of the metadata. The parity data may generally be redundant information relevant to other data portions of the same data file.

The file to be retrieved may be reassembled from the retrieved and restored data portions, as in operation 230. The method may end, as in operation 235.

Figure 3:
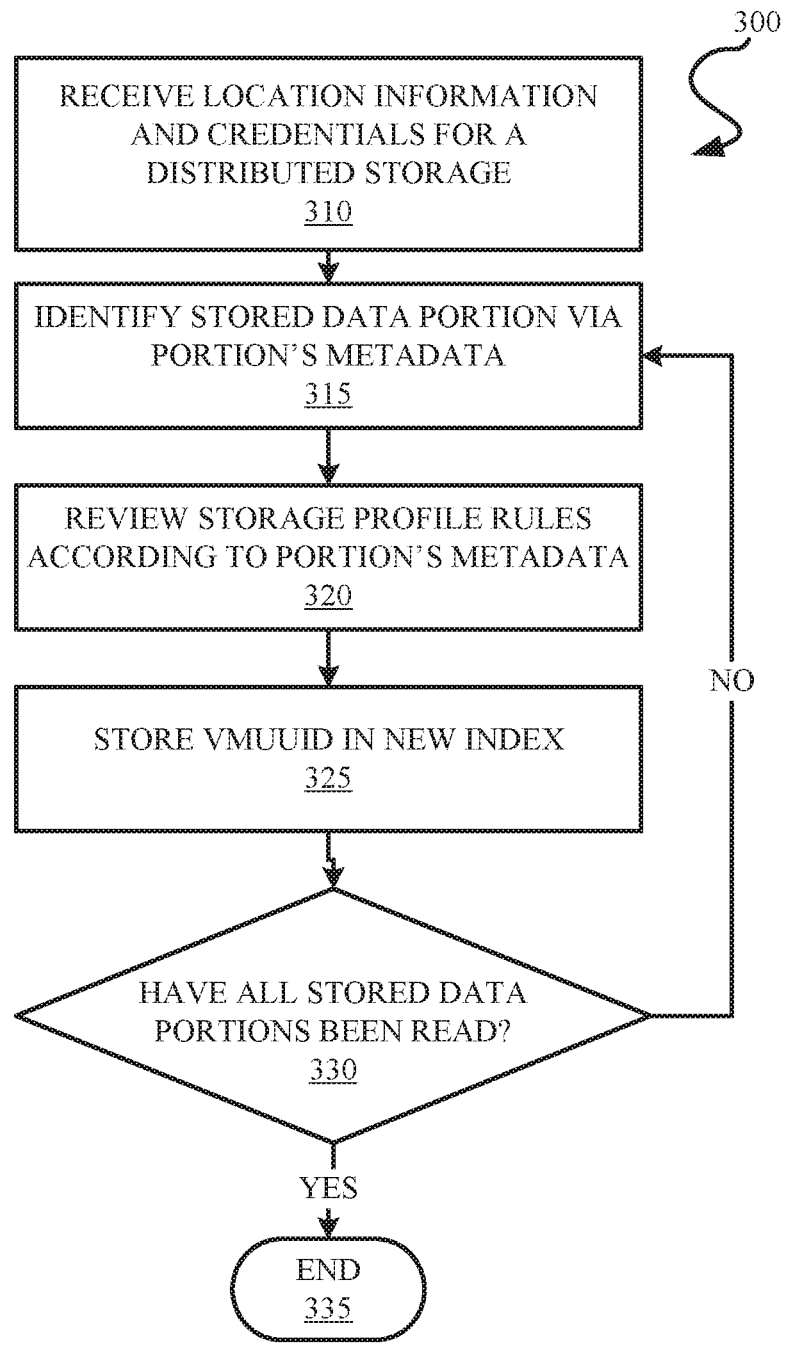
FIG. 3 depicts an example method of restoring access to a distributed storage following the loss of a volume manager, according to embodiments of the present disclosure.

Referring now to FIG. 3, an example method 300 of restoring access to a distributed storage following the loss of a volume manager is shown as a flowchart, according to embodiments of the present disclosure.

A new volume manager may be installed, prior to executing method 300. The new volume manager may be installed by a user or a third-party program responsive to the loss of the previous volume manager. The new volume manager may execute the method 300.

The new volume manager may receive location information and credentials to access a distributed storage, as in operation 310. The volume manager may begin identifying data portions of data files stored in the storage and reviewing each data portion's metadata, as in operation 315. Data portions may be retrieved from the storage at random and scanned to determine if the particular data portion has already been read by the new volume manager, or data portions in the distributed storage may be inventoried by the new volume manger before reading the metadata and recording information to the new volume manager index.

Since the metadata tags associated with each data portion were constructed using the storage profile rules used by the lost volume manager, the new volume manager may review and reconstruct the storage profile rules according the metadata, as in operation 320. Based on storage profile data extracted from each file ID tag, e.g. data type, a cipher level, a parity model, etc., the storage profile rules used by the lost volume manager may be reconstructed.

The new volume manager may reconstruct the volume manager index by extracting each data portion's VMUUID and storing the VMUUID with the data portion's location information in a new index, as in operation 325. The new volume manager may store each VMUUID, and/or file ID tag, and each associated location in the distributed storage in a volume manager index.

Once each data portion's VMUUID and location has been stored in the index, the volume manager may assess whether any data portions remain in the distributed storage to be read and filed in the new index, as in decision block 330. If no data portion remains to be read and filed, the method may end, as in operation 335. If data portions remain to be read and filed, the volume manager may return to operation 315, and identify a new data portion to file by reading the data portion's metadata.

Figure 4A:
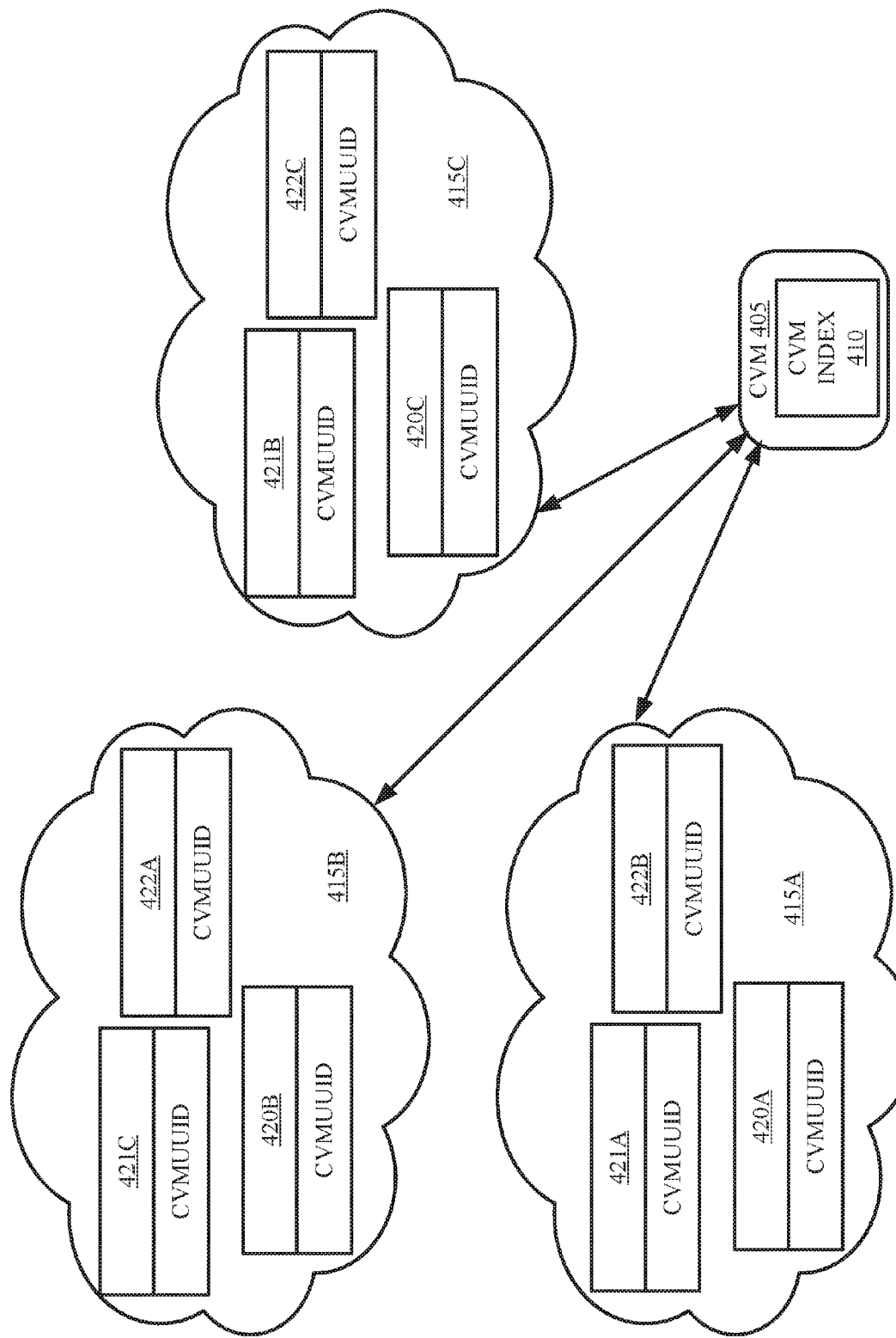
FIG. 4A depicts an example cloud storage environment for the execution of the described methods, according to an embodiment of the present disclosure.

Referring now to FIG. 4A, depicted is an example cloud storage environment for the execution of the described methods, according to an embodiment of the present disclosure. In this example, the volume manager is a cloud volume manager (CVM) 405. The CVM 405 may include at least a CVM index 410 indicating where data portions are stored in the distributed cloud storage of the cloud storage environment.

The CVM 405 may communicate with one or more of storage units, such as cloud storage unit 415A-C of the depicted example. Each storage unit may contain one or more stored data portions, such as data portions 420A, 421A, and 422B in storage unit 415A; data portions 420B, 421C, and 422A in storage unit 415B; and data portions 420C, 421B, and 422C in storage unit 415C. The distribution of data portions among the storage units may be regulated by, for example, storage profile rules, current state-of-the-system determinations made by the volume manager, or by random distribution. It may generally be desirable for various data portions of a given data file to be stored in different storage units, such that the loss of any one of the storage units of the distributed storage will only result in the loss of a single data portion from any given data file.

Figure 4B:
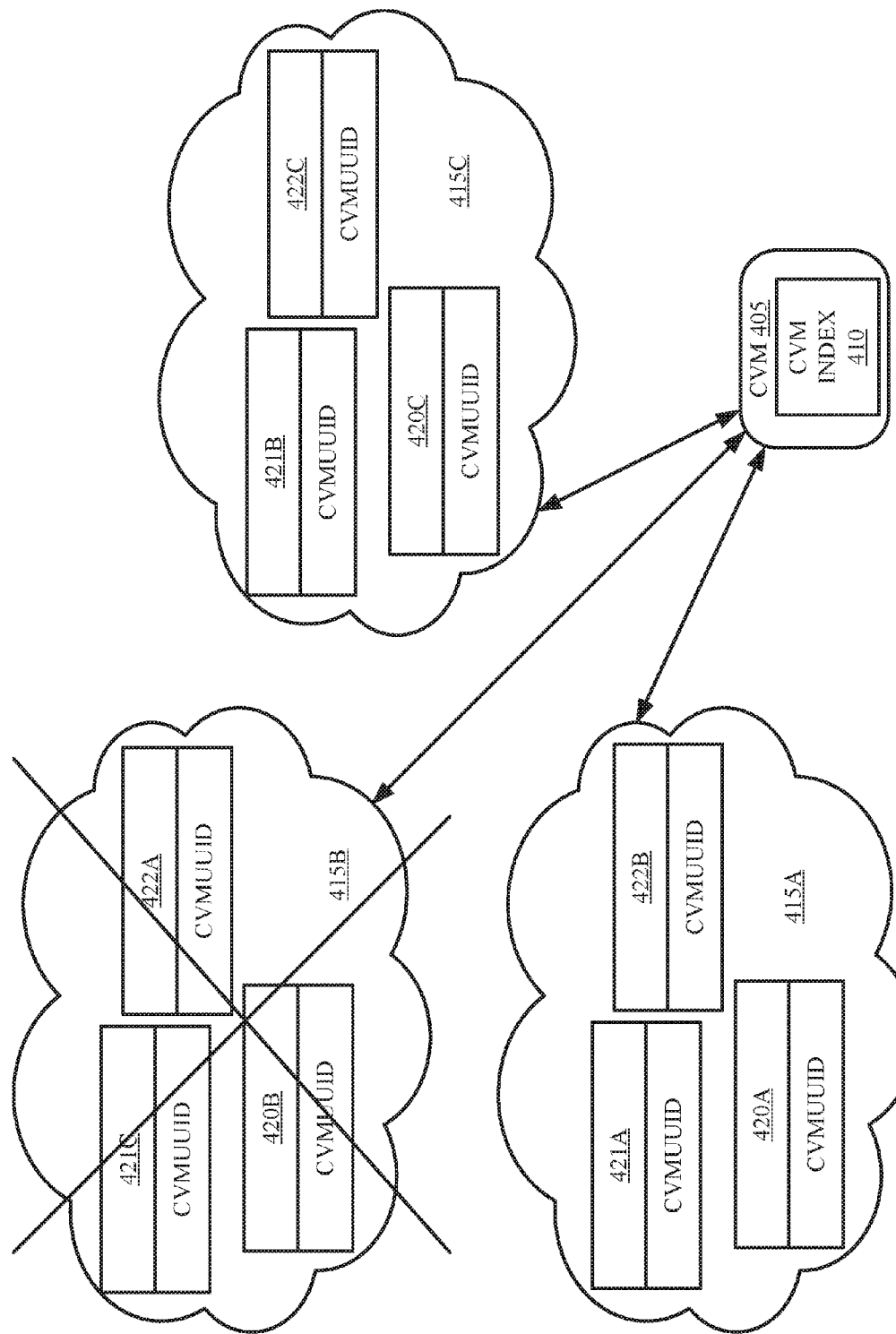
FIG. 4B depicts an example of how the loss of a storage unit may appear to occur in an example cloud distributed storage environment, according to an embodiment of the present disclosure.

Referring now to FIG. 4B, depicted is a diagram illustrating how the loss of a storage unit may appear to occur in an example cloud distributed storage environment, according to an embodiment of the present disclosure. In this example, cloud storage unit 415B is lost, and at least data portions 420B, 421C, and 422A are lost along with it.

If, in this example, CVM 405 were to receive a request to retrieve data file 420, CVM 405 would consult CVM index 410 to determine the number of portions data file 420 is stored in and the location of each data portion. CVM 405 would communicate with storage unit 415A to retrieve data portion 420A and storage unit 415C to retrieve data portion 420C. CVM 405 would attempt to communicate with storage unit 415B to retrieve data portion 420B, but would instead receive indication that the cloud unit has been lost or is unavailable. In response, the CVM 405 may extract parity data from retrieved data portions 420A and 420C and use the parity data to reconstruct the full data file without data portion 420B.

Figure 4C:
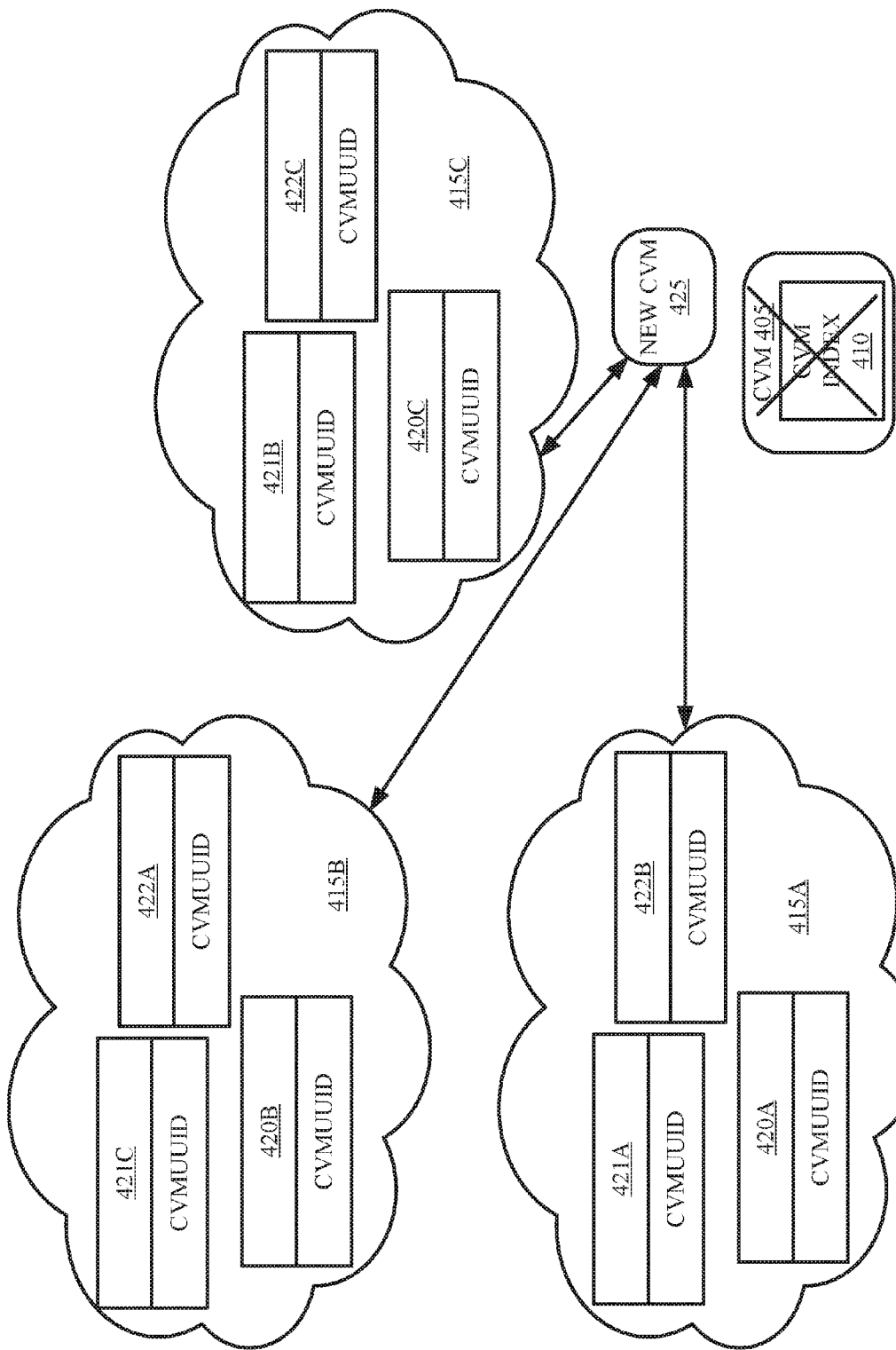
FIG. 4C depicts an example of how the loss of a volume manager may appear to occur in an example cloud distributed storage environment, according to an embodiment of the present disclosure.

Referring now to FIG. 4C, depicted is an example of how the loss of a volume manager may appear to occur in a cloud distributed storage environment, according to an embodiment of the present disclosure. In this example, cloud volume manager 405 may be lost, along with CVM index 410. In response, a new CVM 425 may be installed. New CVM 425 may not initially have a CVM index.

The new CVM 425 may be directed to access the distributed cloud storage 415A-C. In some embodiments, access credentials may need to be provided to the new CVM 425. New CVM 425 may retrieve each data portion 420A, 420B, 421A, etc. and record each data portion's CVMUUID and location. The new CVM 425 may extract additional data from each data portion, e.g. a file ID, the total number of data portions to complete the data file, security layer data, etc., and use this additional information to reconstruct a set of storage profile rules used by the lost CVM 405.

Figure 4D:
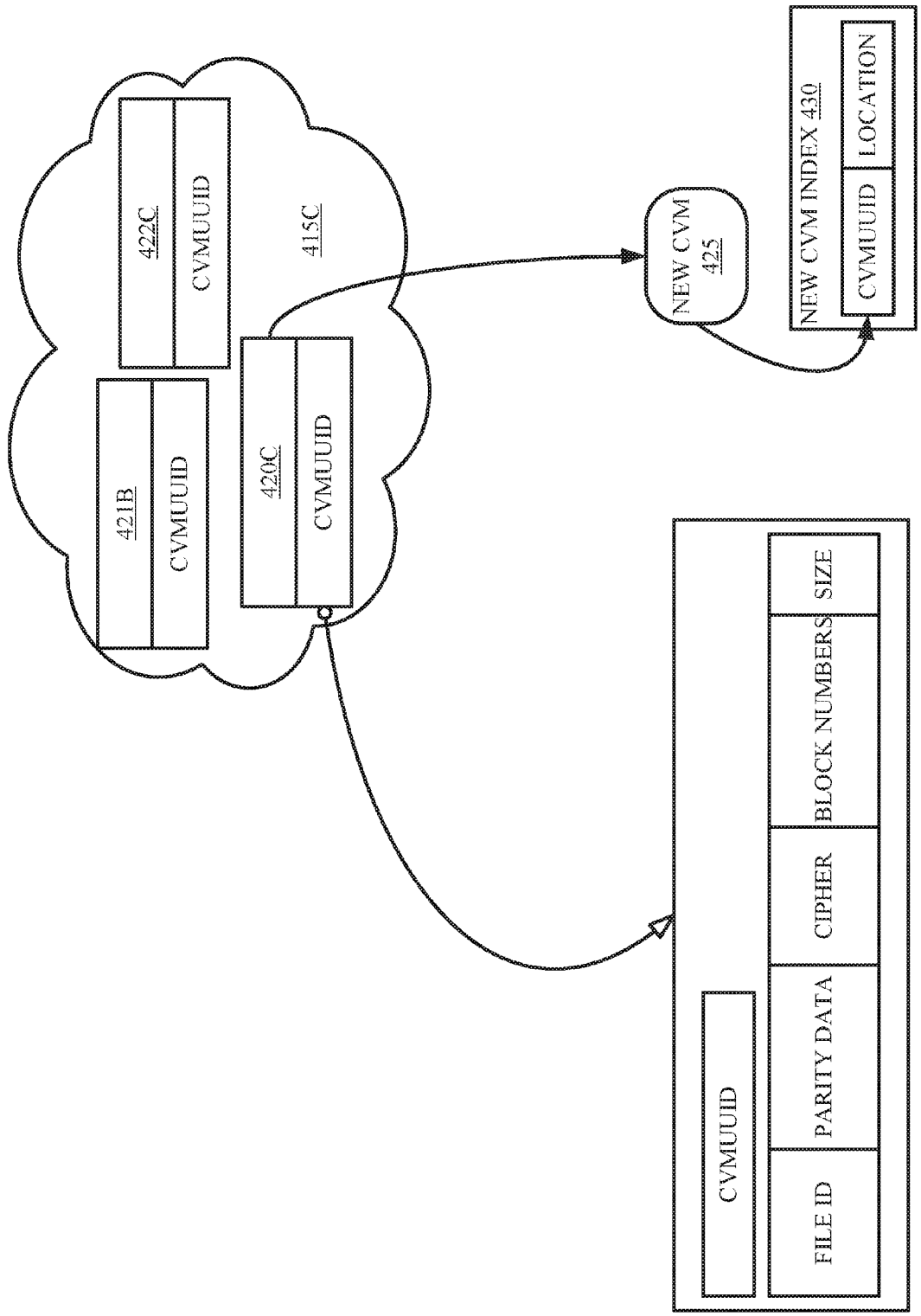
FIG. 4D depicts an example of how the extraction of individual data portions may appear in an example cloud distributed storage environment, according to an embodiment of the present disclosure.

Referring now to FIG. 4D, depicted is an example of how the extraction of individual data portions may appear in an example cloud distributed storage environment, according to an embodiment of the present disclosure. In this example, the new CVM 425 is retrieving data portion 420C from cloud storage unit 415C and adding an entry for data portion 420C to new CVM index 430. Each new entry added to new CVM index 430 may contain at least an associated data portion's CVMUUID and location. CVM index entries may contain additional data, e.g. a file ID for the complete data file, size data, etc. In some embodiments, this additional data may be contained within the CVMUUID. In this example, the CVMUUID for data portion 420C is shown to contain a file ID, parity data, cipher data, block numbers (which may indicate the total number of data portions to complete the full data file), and size data for the file.

It is to be understood that the depicted organization of this disclosure as operating in a cloud environment as in FIGS. 4A-4D is to be non-limiting, as other possible organizations/configurations are possible.

Figure 5:
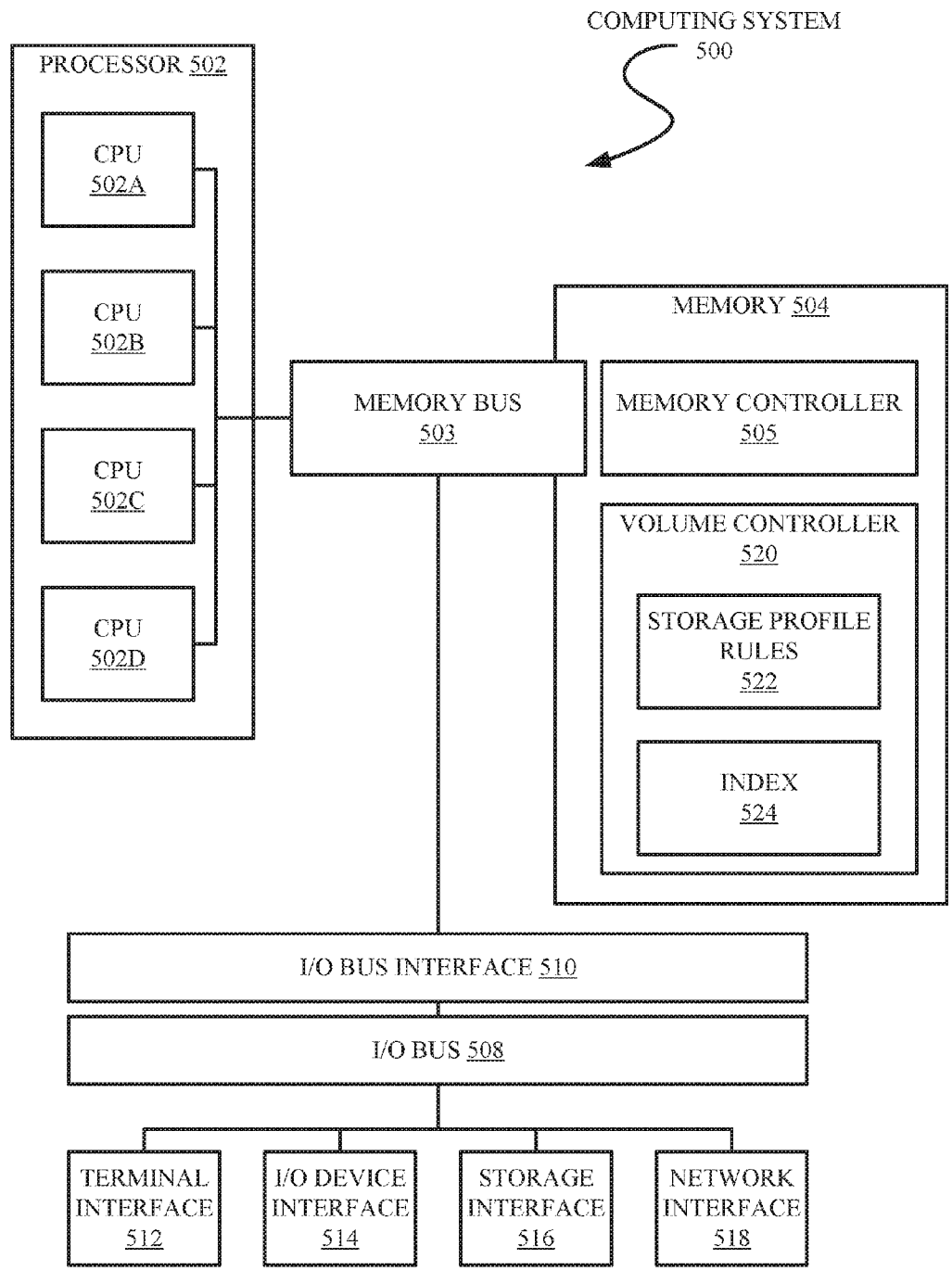
FIG. 5 depicts a high-level block diagram of an example computing system that may be used in implementing the data resiliency methods, and any related functions or operations, described herein, in accordance with embodiments of the present disclosure. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Memory 504 may further contain a volume controller 520 for control of storage allocation functions. The volume controller 520 may store storage profile rules 522 and volume controller index 524.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or data portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for data recovery following loss of a volume manager, the method comprising:
determining that the volume manager, and an associated volume manager index, for a distributed storage have been lost;
installing, in response to determining that the volume manager has been lost, a new volume manager, the new volume manager lacking an associated volume manager index;
receiving location information and credentials to access the distributed storage;
receiving a command to recover data from the distributed storage, the data to be recovered comprising one or more data files, each data file stored as two or more data portions, each data portion comprising metadata, the metadata comprising a file ID tag;
attempting to retrieve each data portion from the distributed storage;
retrieving a first data portion and recording a first location in the distributed storage that the first data portion was retrieved from;
reading the first file ID tag attached to the first data portion; and
constructing, in response to determining that the associated volume manager index has been lost, a new volume manager index by storing the first file ID tag and the first location associated with the first data portion in the distributed storage in the new volume manager index such that the new volume manager index provides a reference, to the new volume manager, for the first location and the first file ID tag, the reference associated with the first data portion.

2. The method of claim 1, further comprising retrieving a second data portion from the distributed storage and recording a second location in the distributed storage that the second data portion was retrieved from;
reading the second file ID tag attached to the second data portion; and
storing the second file ID tag and the second location associated with the second data portion in the distributed storage in the new volume manager index.

3. The method of claim 2, further comprising recovering a set of storage profile rules based on storage profile data extracted from each retrieved file ID tag, the storage profile data including at least a data type, a cipher level, and a parity model.

4. The method of claim 3, wherein a data file is divided into two or more data portions according to the set of storage profile rules.

5. The method of claim 3, wherein each of the two or more data portions of a data file have a different cipher level.

6. The method of claim 3, wherein the storage profile data further comprises a total number of portions needed to complete a data file and a size associated with the data file.

7. The method of claim 6, further comprising identifying a data file with a missing data portion, wherein the data file is identified as missing the missing data portion based on the total number of portions needed to complete the data file as read from the file ID tag of one or more recovered data portions of the data file;
extracting parity data from each of the recovered data portions of the data file; and
reassembling the data file using the recovered data portions and the parity data from the file ID tag of the recovered data portions, such that the missing data portion is reconstructed using the parity data.

8. The method of claim 1, further comprising generating a new file ID tag for a new data file to be stored in the distributed storage.

9. The method of claim 1, wherein the distributed storage is a cloud storage and each data portion of a data file is stored in a different unit of the cloud storage.

10. A computer system for data recovery following the loss of a volume manager, the computer system comprising:
a memory; and
a processor in communication with the memory, wherein the computer system is configured to perform a method, the method comprising:
determining that the volume manager, and an associated volume manager index, for a distributed storage have been lost;
installing, in response to determining that the volume manager has been lost, a new volume manager, the new volume manager lacking an associated volume manager index;
receiving location information and credentials to access the distributed storage;
receiving a command to recover data from the distributed storage, the data to be recovered comprising one or more data files, each data file stored as two or more data portions, each data portion comprising metadata, the metadata comprising a file ID tag;
attempting to retrieve each data portion from the distributed storage;
retrieving a first data portion and recording a first location in the distributed storage that the first data portion was retrieved from;
reading the first file ID tag attached to the first data portion; and
constructing, in response to determining that the associated volume manager index has been lost, a new volume manager index by storing the first file ID tag and the first location associated with the first data portion in the distributed storage in the new volume manager index such that the new volume manager index provides a reference, to the new volume manager, for the first location and the first file ID tag, the reference associated with the first data portion.

11. The computer system of claim 10, further comprising retrieving a second data portion from the distributed storage and recording a second location in the distributed storage that the second data portion was retrieved from;
reading the second file ID tag attached to the second data portion; and
storing the second file ID tag and the second location associated with the second data portion in the distributed storage in the new volume manager index.

12. The computer system of claim 11, further comprising a set of storage profile rules, the storage profile rules recovered using storage profile data extracted from each file ID tag, the storage profile data including at least a data type, a cipher level, and a parity model.

13. The computer system of claim 12, wherein each data file is divided into two or more data portions according to the set of storage profile rules.

14. The computer system of claim 12, wherein each of the two or more data portions of a data file have a different cipher level.

15. The computer system of claim 12, wherein the storage profile data further contains the total number of portions needed to complete the data file and the size of the complete data file.

16. The computer system of claim 14, wherein the method further comprises:
- identifying a data file with a missing data portion, wherein the data file is identified as missing the missing data portion based on the total number of portions needed to complete the data file as read from the file ID tag of one or more recovered data portions of the data file;
- extracting parity data from each of the recovered data portions of the data file; and
- reassembling the data file using the recovered data portions and the parity data from the file ID tag of the recovered data portions, such that the missing data portion is reconstructed using the parity data.

17. A computer program product for data recovery following loss of a volume manager, the computer program product comprising a computer readable storage medium having program instructions embodied therewith, wherein the computer readable storage medium is not a transitory signal per se, the program instructions executable by a processor to perform a method comprising:
- determining that the volume manager, and an associated volume manager index, for a distributed storage have been lost;
- installing, in response to determining that the volume manager has been lost, a new volume manager, the new volume manager lacking an associated volume manager index;
- receiving location information and credentials to access the distributed storage;
- receiving a command to recover data from the distributed storage, the data to be recovered comprising one or more data files, each data file stored as two or more data portions, each data portion comprising metadata, the metadata comprising a file ID tag;
- attempting to retrieve each data portion from the distributed storage;
- retrieving a first data portion and recording a first location in the distributed storage that the first data portion was retrieved from;
- reading the first file ID tag attached to the first data portion; and
- constructing, in response to determining that the associated volume manager index has been lost, a new volume manager index by storing the first file ID tag and the first location associated with the first data portion in the distributed storage in the new volume manager index such that the new volume manager index provides a reference, to the new volume manager, for the first location and the first file ID tag, the reference associated with the first data portion.

* * * * *